US012694312B2

(12) United States Patent

Helmsen et al.

(10) Patent No.: US 12,694,312 B2

(45) Date of Patent: Jul. 28, 2026

(54) GENERATIVE ADVERSARIAL NETWORKS FOR USE IN REFINING MODELS FOR SYNTHETIC NETWORK TRAFFIC DATA

(71) Applicant: NOBLIS, INC., Reston, VA (US)

(72) Inventors: John Helmsen, Rockville, MD (US); Oscar Olmedo, Washington, DC (US); Mark Sanders, Reston, VA (US)

(73) Assignee: NOBLIS, INC., Reston, VA (US)

( * ) Notice: Subject to any disclaimer, the term of this patent is extended or adjusted under 35 U.S.C. 154(b) by 1293 days.

(21) Appl. No.: 17/386,715

(22) Filed: Jul. 28, 2021

(65) Prior Publication Data

US 2022/0086174 A1 Mar. 17, 2022

Related U.S. Application Data

(60) Provisional application No. 63/078,001, filed on Sep. 14, 2020.

(51) Int. Cl.

| | |
|---|---|
| *G06N 7/01* | (2023.01) |
| *G06N 3/0475* | (2023.01) |
| *G06N 3/088* | (2023.01) |
| *G06N 20/00* | (2019.01) |
| *H04L 47/2441* | (2022.01) |
| *H04L 47/2483* | (2022.01) |

(52) U.S. Cl.

CPC ............ *G06N 7/01* (2023.01); *G06N 3/0475* (2023.01); *G06N 3/088* (2013.01); *G06N 20/00* (2019.01); *H04L 47/2441* (2013.01); *H04L 47/2483* (2013.01)

(58) Field of Classification Search

CPC ........ G06N 20/00; G06N 3/042; G06N 3/045; G06N 3/047; G06N 3/0475; G06N 3/088; G06N 7/01; G06N 3/09; G06N 3/094; H04L 47/2441; H04L 47/2483; H04L 63/1416

See application file for complete search history.

(56) References Cited

PUBLICATIONS

Cheng et al., "PAC-GAN: Packet Generation of Network Traffic using Generative Adversarial Networks", Dec. 19, 2019, 2019 IEEE 10th Annual Information Technology, Electronics and Mobile Communication Conference (IEMCON), pp. 0728-0734. (Year: 2019).*

Liu et al., "TreeGAN: Syntax-aware Sequence Generation with Generative Adversarial Networks", Dec. 30, 2018, 2018 IEEE International Conference on Data Mining (ICDM), pp. 1140-1145. (Year: 2018).*

(Continued)

*Primary Examiner* — Brent Johnston Hoover

(74) *Attorney, Agent, or Firm* — Morrison & Foerster LLP

(57) ABSTRACT

A system for refining one or more synthetic network traffic models is provided. The system generates synthetic network traffic data by applying a deterministic generative rule set to generate at least part of the synthetic network traffic data and applying a probabilistic generative model to generate at least part of the synthetic network traffic data. The system generates an assessment of the generated synthetic network traffic data by applying a deterministic discriminative rule set to the synthetic network traffic data and by applying a discriminative classifier model to the synthetic network traffic data. The system updates one or both of the probabilistic generative model and the discriminative classifier model based on the generated assessment.

24 Claims, 3 Drawing Sheets

(56) References Cited

PUBLICATIONS

Ring et al., "Flow-based network traffic generation using Generative Adversarial Networks", Dec. 26, 2018, Computers & Security, vol. 82, May 2019, pp. 156-172. (Year: 2018).*

Barradas et al. "Effective Detection of Multimedia Protocol Tunneling using Machine Learning," Proceedings of the 27th UNISEX Security Symposium, Aug. 15-17, 2018, Baltimore, MD; 18 pages.

Dyer et al. "Marionette: A Programmable Network Traffic Obfuscation System," 24th USENIX Security Symposium, Aug. 12-14, 2015, Washington, DC; 17 pages.

Frost et al. (2006). "A New Top-Down Parsing Algorithm to Accommodate Ambiguity and Left Recursion in Polynomial Time," ACM SIGPLAN Notices 41(5): 46-54.

Hu et al. "GANFuzz: A GAN-Based Industrial Network Protocol Fuzzing Framework," Proceedings of the 15th ACM International Conference on Computing Frontier, May 8-10, 2018, Ischia, Italy; pp. 138-145.

Hu et al. (2016). "Harnessing Deep Neural Networks with Logic Rules," arXiv:1603.06318; 20 pages.

Netresec. "Publicly Available PCAP Files," located at < http://web.archive.org/web/20200813134225/https://www.netresec.com/?page=PcapFiles > retrieved on Aug. 13, 2020 (6 pages).

* cited by examiner

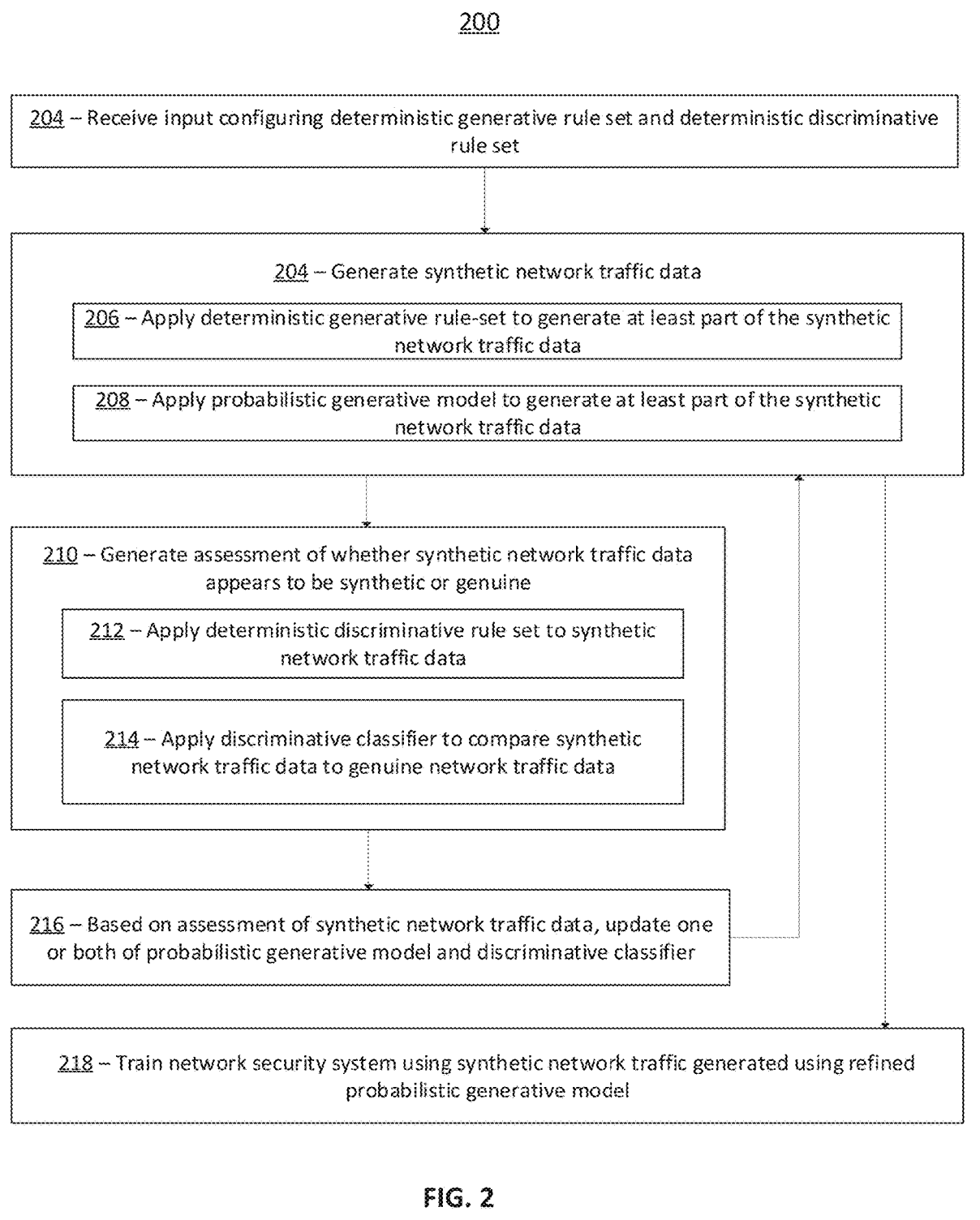

200

204 – Receive input configuring deterministic generative rule set and deterministic discriminative rule set 204 – Generate synthetic network traffic data 206 – Apply deterministic generative rule-set to generate at least part of the synthetic network traffic data 208 – Apply probabilistic generative model to generate at least part of the synthetic network traffic data 210 – Generate assessment of whether synthetic network traffic data appears to be synthetic or genuine 212 – Apply deterministic discriminative rule set to synthetic network traffic data 214 – Apply discriminative classifier to compare synthetic network traffic data to genuine network traffic data 216 – Based on assessment of synthetic network traffic data, update one or both of probabilistic generative model and discriminative classifier 218 – Train network security system using synthetic network traffic generated using refined probabilistic generative model

FIG. 2

GENERATIVE ADVERSARIAL NETWORKS FOR USE IN REFINING MODELS FOR SYNTHETIC NETWORK TRAFFIC DATA

CROSS-REFERENCE TO RELATED APPLICATIONS

This application claims the priority of U.S. Provisional Application No. 63/078,001, filed Sep. 14, 2020, the entire contents of which are incorporated herein by reference.

FIELD

This relates generally to synthetic network traffic data, and more specifically to using generative adversarial networks to refine models for generating and classifying synthetic network traffic data.

BACKGROUND

Cyber-analytics systems for analyzing network traffic data at the packet level and at the flow level are critical to many cyber-security applications. Currently, deep-packet inspection systems and network-flow analyzer systems apply predefined rules to analyze network traffic data to identify security risks and threats. However, advancements in network protocol obfuscation is making traditional rule-based cyber-security systems easier to evade. Accordingly, there is a need for improved cyber-analytics systems that can recognize patterns in network traffic data that are indicative of malicious or harmful network traffic, even when said patterns are not easily recognizable to humans and therefore cannot easily be reflected in traditional rule-based systems coded by humans. One approach to developing said improved cyber-analytics systems is to apply machine learning to train systems that are able to identify complex patterns in malicious network traffic data that are difficult or impossible for humans to code.

SUMMARY

As explained above, one approach to developing improved cyber-analytics systems is to apply machine learning to train systems for use in network security applications. However, the development of said improved systems using machine learning has been hampered by the lack of availability of sufficient quantities of network traffic data with which to train said cyber-analytics models. While network traffic data can be captured from real-world network environments and stored in corpuses on which to train cyber-analytics models, the capture and use of real-world network traffic data is difficult or non-optimal for several reasons.

First, building a corpus of network traffic data that is representative of typical network traffic at large—e.g., internet traffic—is difficult because many environments in which network traffic data may be captured present non-representative data characteristics. For example, data captured from internal network environments such as corporate networks or university networks may be inherently non-representative of wider network traffic. Similarly, data captured from hackathons or from other cybersecurity-focused events may present with unusually high rates of malicious or anomalous code and unusually low rates of typical, non-malicious code.

Second, building a corpus of network traffic data that is representative of a highly-specific type of network environment may also be difficult. For highly-specific network environments, developers may simply not have access to a source or sufficient network traffic data to build the corpus required.

Third, building a large corpus of network traffic data may be hampered by lack of access and usability due to data privacy laws/regulations and/or restrictions on access to classified or otherwise sensitive network traffic data.

Thus, associated with the need to develop improved cyber-analytics systems is the need to build sufficiently large corpuses of network-traffic data; these corpuses of network traffic data must have the data characteristics of the specific kind of network traffic that is to be analyzed by an algorithm trained using the corpus of network traffic data.

Disclosed herein are systems and methods for using generative adversarial networks to refine models for generating synthetic network data by using an adversarial arrangement that trains a generative model against a discriminative classifier model. Once a generative model has been trained using the techniques disclosed herein, the model may be used to generate synthetic network traffic data to build a corpus of synthetic training data, wherein the corpus of synthetic training data will have the required data characteristics in order for the corpus to be used to train cyber-analytics algorithms for use in network security applications in deep-packet inspection and/or flow-based analysis.

In some embodiments, as described herein, a generative adversarial network system for refining network traffic models may be configured such that a generative model and a discriminative model may be trained against one another. The generative model may be configured to generate synthetic network traffic data (e.g., synthetic pcap data and/or synthetic flow data) and the discriminative model may be configured to classify data as genuine or synthetic based at least in part on comparing the data to a corpus of known genuine data. Thus, the generative model may generate synthetic network traffic data that may be fed to the discriminative model, and the discriminative model may attempt to determine whether the synthetic data is genuine or synthetic. Based on the results of the attempted classification of the synthetic data (e.g., whether or not the discriminative model successfully identified the synthetic data as synthetic), one or both of the generative model and the discriminative model may be updated in order to improve performance in future iterations.

While traditional generative adversarial network architectures have been applied in the domains of image recognition and voice recognition, they have not been successfully applied in the network traffic data space. This is, in part, because generative models for use in generative adversarial networks are based on probabilistic principles that cause random variations in the generated data. While slight random variations are often acceptable for image data and voice data, which do not have strict syntactical rules, similar slight random variations in network traffic data will result in an unacceptably high number of violations of strict rules for network traffic data syntax. That is, genuine network traffic data must comply with more strict and more numerous syntactical requirements in order for the data to be able to be processed by routers and to function in network systems; thus, synthetic data having even a very small number of random variations that violate these strict syntactical requirements will be easily identifiable as synthetic data, making a learning process using a traditional GAN architecture slow, cumbersome, and ineffective.

To address the shortcomings of traditional GAN architectures described above, the systems disclosed herein may combine probabilistic models with rule-based, hard-coded, deterministic restrictions. The deterministic restrictions may set requirements that are based on predefined rules for network traffic data, such as syntactical rules defined by one or more network traffic protocols and/or memorialized in one or more RFC documents. In some embodiments, the deterministic rules may be implemented in conjunction with the generative model to form a generative system that leverages both inviolable hard-coded rules and a probabilistic model to generate synthetic network traffic data. In some embodiments, additionally or alternatively, the deterministic rules may be implemented in conjunction with the discriminative model to form a discriminative system that leverages both inviolable hard-coded rules and a probabilistic discriminative classifier model to assess whether network traffic data is synthetic or genuine. In some embodiments, the GAN may be configured such that, while the probabilistic generative model and/or discriminative classifier model may be updated based on outcomes of prior iterations of assessment of synthetic data, the deterministic rules may not be updated based on outcomes of prior iterations of assessment of synthetic data.

Thus, as described herein below in additional detail, the systems and methods disclosed herein may provide adaptable generative adversarial network systems for refining models for generating and/or classifying synthetic network traffic data, wherein a user may be afforded controls by way of hard-coded deterministic rules stipulating certain inviolable characteristics of the network traffic data for which the generative and/or discriminative models are to be optimized. Thus, using the systems described herein, models for generating synthetic network traffic data may be refined and improved and may ultimately be optimized to be able to be used for the creation of large corpuses of synthetic network traffic data, such that said corpuses of synthetic network traffic data may then be used for research purposes and/or to train one or more machine-learning-based network security systems.

In some embodiments, a first system for refining one or more synthetic network traffic models is provided, the first system comprising one or more processors configured to: generate synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generate an assessment of the generated synthetic network traffic data by comparing the generated synthetic network traffic data to genuine network traffic data, wherein generating the assessment comprises applying a discriminative classifier model; and update one or both of the probabilistic generative model and the discriminative classifier model based at least in part on the generated assessment.

In some embodiments of the first system, applying the deterministic generative rule set comprises enforcing a context-free grammar.

In some embodiments of the first system, generating the synthetic network traffic data comprises generating a plurality of synthetic network traffic packets.

In some embodiments of the first system, generating the synthetic network traffic data comprises generating synthetic IP address data.

In some embodiments of the first system, generating the synthetic network traffic data comprises generating synthetic message hash and identifier data.

In some embodiments of the first system, generating the synthetic network traffic data comprises generating synthetic data regarding a network traffic mode.

In some embodiments of the first system, generating the synthetic network traffic data comprises generating network time protocol (NTP) data.

In some embodiments of the first system: applying the deterministic generative rule set comprises, if a first data object is generated, requiring that set of one or more data objects related to the first data object also be generated; and applying the probabilistic generative model comprises generating a data value for one or both of the first data object and the set of one or more data objects.

In some embodiments of the first system: applying the deterministic generative rule set comprises setting a predetermined range for a data value; and applying the probabilistic generative model comprises generating the data value within the predetermined range.

In some embodiments of the first system, applying the deterministic generative rule set comprises enforcing temporal relationship criteria for a time-series of data objects.

In some embodiments of the first system, applying the deterministic generative rule set comprises enforcing a cross-correlation condition.

In some embodiments of the first system, applying the deterministic generative rule set comprises generating the synthetic network traffic data such that the synthetic network traffic data is configured to be processed by a router In some embodiments, a first method for refining one or more synthetic network traffic models is provided, the first method performed at a system comprising one or more processors, the first method comprising: generating synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generating an assessment of the generated synthetic network traffic data by comparing the generated synthetic network traffic data to genuine network traffic data, wherein generating the assessment comprises applying a discriminative classifier model; and updating one or both of the probabilistic generative model and the discriminative classifier model based at least in part on the generated assessment.

In some embodiments, a first non-transitory computer-readable storage medium for refining one or more synthetic network traffic models is provided, the first non-transitory computer-readable storage medium storing instructions configured to be executed by one or more processors of a system to cause the system to: generate synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generate an assessment of the generated synthetic network traffic data by comparing the generated synthetic network traffic data to genuine network traffic data, wherein generating the assessment comprises applying a discriminative classifier model; and update one or both of the probabilistic generative model and the discriminative classifier model based at least in part on the generated assessment.

In some embodiments, a second system for refining one or more synthetic network traffic models is provided, the second system comprising one or more processors configured to: generate synthetic network traffic data, wherein generating the synthetic network traffic data comprises applying a probabilistic generative model to generate at least part of the synthetic network traffic data; generate an assessment of the generated synthetic network traffic data, wherein generating the assessment comprises: applying a deterministic discriminative rule set to the synthetic network traffic data; and applying a discriminative classifier model to the synthetic network traffic data; and update one or both of the probabilistic generative model and the discriminative classifier model based at least in part on the generated assessment.

In some embodiments of the second system, applying the deterministic generative rule set comprises enforcing a context-free grammar.

In some embodiments of the second system: applying the deterministic discriminative rule set to the synthetic network traffic data comprises generating deterministic discriminative rule set output data; applying the discriminative classifier model to the synthetic network traffic data comprises generating discriminative classifier model output data; and generating the assessment of the generated synthetic network traffic data comprises combining the deterministic discriminative rule set output data and the discriminative classifier model output data.

In some embodiments of the second system: applying the deterministic discriminative rule set comprises, if a first data object is present in the generated synthetic network traffic data, requiring that a set of one or more data objects related to the first data object also be present in the generated synthetic network traffic data; and applying the discriminative classifier model comprises assessing a data value for one or both of the first data object and the set of one or more data objects.

In some embodiments of the second system: applying the deterministic discriminative rule set comprises requiring that a data value of the generated synthetic network traffic be within a predetermined range; and applying the probabilistic generative model comprises assessing the data value within the predetermined range.

In some embodiments, a second for refining one or more synthetic network traffic models is provided, the second method performed at a system comprising one or more processors, the second method comprising: generating synthetic network traffic data, wherein generating the synthetic network traffic data comprises applying a probabilistic generative model to generate at least part of the synthetic network traffic data; generating an assessment of the generated synthetic network traffic data, wherein generating the assessment comprises: applying a deterministic discriminative rule set to the synthetic network traffic data; and applying a discriminative classifier model to the synthetic network traffic data; and updating one or both of the probabilistic generative model and the discriminative classifier model based at least in part on the generated assessment.

In some embodiments, a second non-transitory computer-readable storage medium for refining one or more synthetic network traffic models is provided, the second non-transitory computer-readable storage medium storing instructions configured to be executed by one or more processors of a system to cause the system to: generate synthetic network traffic data, wherein generating the synthetic network traffic data comprises applying a probabilistic generative model to generate at least part of the synthetic network traffic data; generate an assessment of the generated synthetic network traffic data, wherein generating the assessment comprises: applying a deterministic discriminative rule set to the synthetic network traffic data; and applying a discriminative classifier model to the synthetic network traffic data; and update one or both of the probabilistic generative model and the discriminative classifier model based at least in part on the generated assessment.

In some embodiments, a third system for refining one or more synthetic network traffic models, the third system comprising one or more processors configured to: generate synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generate an assessment of the generated synthetic network traffic data, wherein generating the assessment comprises: applying a deterministic discriminative rule set to the synthetic network traffic data; and applying a discriminative classifier model to the synthetic network traffic data; and update one or both of the probabilistic generative model and the discriminative classifier model based at least in part on the generated assessment.

In some embodiments, a third method for refining one or more synthetic network traffic models is provided, the third method performed at a system comprising one or more processors, the third method comprising: generating synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generating an assessment of the generated synthetic network traffic data, wherein generating the assessment comprises: applying a deterministic discriminative rule set to the synthetic network traffic data; and applying a discriminative classifier model to the synthetic network traffic data; and updating one or both of the probabilistic generative model and the discriminative classifier model based at least in part on the generated assessment.

In some embodiments, a third non-transitory computer-readable storage medium for refining one or more synthetic network traffic models is provided, the third non-transitory computer-readable storage medium storing instructions configured to be executed by one or more processors of a system to cause the system to: generate synthetic network traffic data, wherein generating the synthetic network traffic data comprises: applying a deterministic generative rule set to generate at least part of the synthetic network traffic data; and applying a probabilistic generative model to generate at least part of the synthetic network traffic data; generate an assessment of the generated synthetic network traffic data, wherein generating the assessment comprises: applying a deterministic discriminative rule set to the synthetic network traffic data; and applying a discriminative classifier model to the synthetic network traffic data; and update one or both of the probabilistic generative model and the discriminative classifier model based at least in part on the generated assessment.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

FIG. 2 depicts a method for refining models for generating and classifying synthetic network traffic data, in accordance with some embodiments.

DETAILED DESCRIPTION

Described herein are exemplary embodiments of systems and methods for refining models for generating and classifying synthetic network traffic data, in accordance with some embodiments. The systems and methods disclosed herein may address the problems and shortcomings of known systems and methods for generating synthetic network traffic data described above.

As described above, there is a need for improved systems and methods for generating synthetic network traffic data, and there is a related need for improved systems and methods for refining models for creating and/or classifying synthetic network traffic data. Disclosed herein are systems, methods, and techniques that may address those needs, including by providing generative adversarial network systems in which hard-coded inviolable rules may be combined with a probabilistic generative model and/or with a probabilistic discriminative model in order to improve performance of the GAN systems at refining and improving generative and/or discriminative models. Exemplary systems and methods are described below.

Exemplary System

Figure 1:
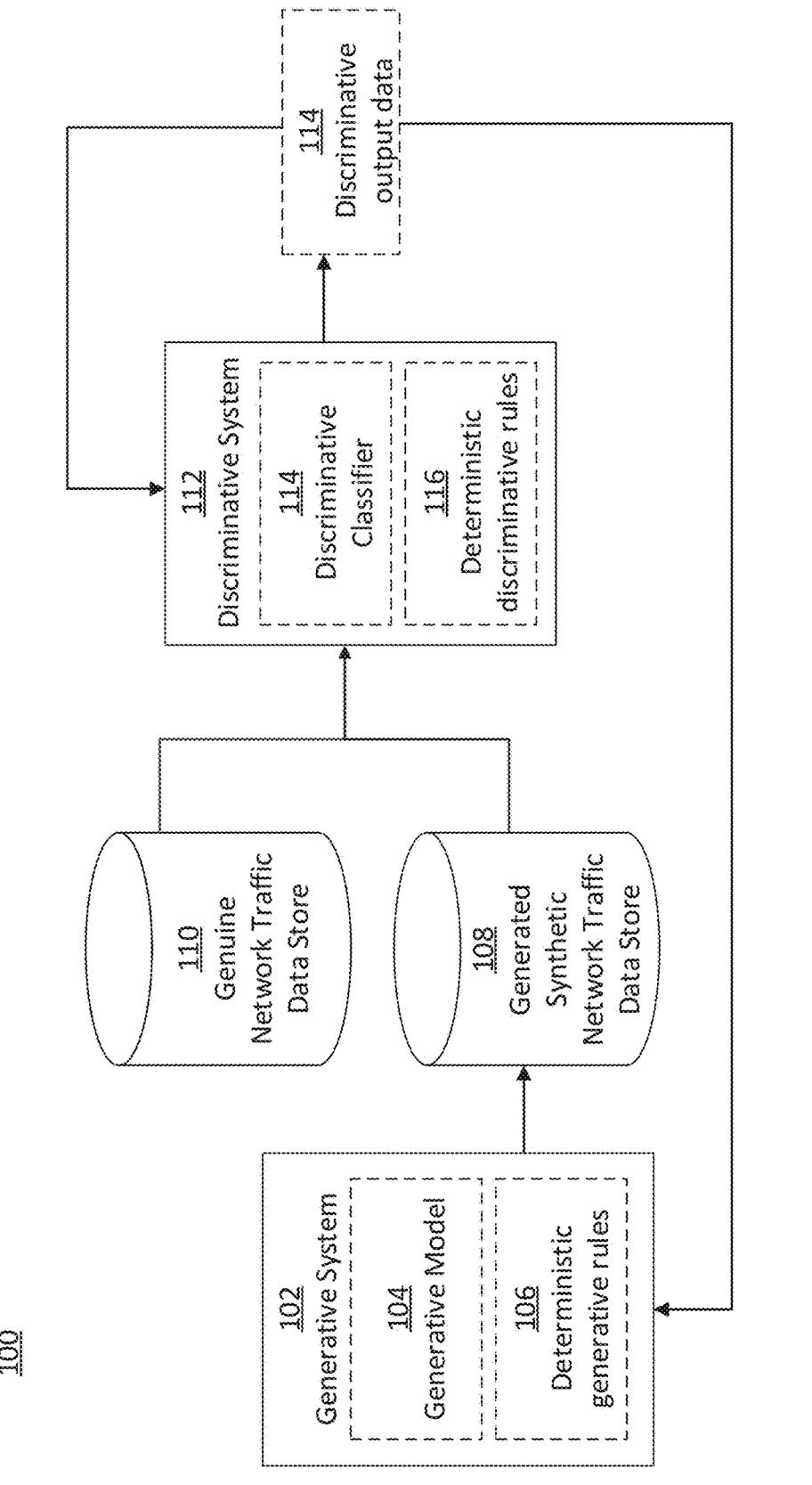
FIG. 1 depicts a system for refining models for generating and classifying synthetic network traffic data, in accordance with some embodiments.

FIG. 1 depicts a system 100 for refining models for generating and classifying synthetic network traffic data, in accordance with some embodiments. As described below, system 100 may be a generative adversarial network system in which a probabilistic generative model works in conjunction with a set of hard-coded generative rules to create synthetic network traffic data, and in which a probabilistic discriminative model works in conjunction with a set of hard-coded discrimination rules to compare the generated synthetic network traffic data to genuine network traffic data in order to generate an assessment as to whether the generated synthetic network traffic data appears to be genuine. Based on the outcomes generated by comparing the generated synthetic network traffic data to the genuine network traffic data, one or both of the probabilistic generative model and the discriminative classifier may be modified in order to improve future performance.

System 100 may comprise generative system 102, generated synthetic network traffic data 108, genuine network traffic data 108, discriminative system 112, and discriminative output data 118. As described below, generative system 102 and discriminative system 112 may together constitute a generative adversarial network system configured to refine and improve generative model 104 and discriminative classifier 114 by training them against one another, with generative system 102 and discriminative system 112 each configured to update the respective models/classifiers based on the outcomes (as represented by discriminative output data 118) of previous iterations of attempts by discriminative system 112 to classify synthetic data generated by generative system 102.

Generative system 102 may comprise any one or more computer systems configured to generate synthetic network traffic data, which may include synthetic packet data (e.g., PCAP data), entire synthetic network packets, synthetic message hash data (e.g., which may be generated directly from a synthetic message by hashing the synthetic message), synthetic message identifier data, synthetic data regarding network traffic modes, synthetic network time protocol (NTP) data (including one or more NTP features), synthetic flow data, and/or any other type of synthetic data that mimics genuine network traffic data. In some embodiments, generative system 102 may comprise any one or more processors, personal computers, super-computers, servers, and/or virtual machines configured to execute instructions stored locally or remotely to generate, configure, modify, store, and/or transmit synthetic network traffic data.

As shown in FIG. 1, generative system 102 may comprise generative model 104 and deterministic generative rules 106, each of which may be a set of instructions stored on one or more storage mediums and configured to be executed by one or more processors of generative system 102 as part of the process by which generative system 102 generates synthetic network traffic data. In some embodiments, generative model 104 and deterministic generative rules 106 may be stored on the same storage medium and/or configured to be executed by the same one or more processors. In some embodiments, generative model 104 and deterministic generative rules 106 may be stored on different storage mediums and/or configured to be executed by different sets of one or more processors.

In some embodiments, generative model 104 may be a probabilistic model configured to generate at least part of the synthetic network traffic data generated by generative system 102. Generative model 104 may be configured to create probabilistic variations in the data generated, for example by using one or more random number generators to randomize one or more aspects of the generated data. In some embodiments, as discussed further below, generative model 104 may be configured to be updated by generative system 102 based on results of attempts by discriminative system 112 to classify synthetic network traffic data generated by generative system 102. In this way, generative model 104 may be configured to be refined and improved (e.g., trained) by generative system 102 over many iterations, such that, over time, the algorithms applied by generative model 104 may result in synthetic network traffic data that is more and more difficult for discriminative system 112 to recognize.

In some embodiments, deterministic generative rules 106 may comprise a set of one or more hard-coded, manually-specified, non-probabilistic, and/or inviolable requirements configured to be applied to generate at least part of the synthetic network traffic data generated by generative system 102. In some embodiments, deterministic generative rules 106 may be defined by a user configuring system 100; e.g., a user may hard code or otherwise specify one or more inviolable requirements for the synthetic network-traffic data to be generated by generative system 102. In some embodiments, generative system 102 may be configured such that deterministic generative rules 106 may not be updated automatically by generative system 102 based on results of attempts by discriminative system 112 to classify synthetic network traffic data generated by generative system 102; in some embodiments, generative system 102 may be configured such that deterministic generative rules 106 may only be updated or modified by manual user input, or by another (potentially automated) process that is separate and apart from the automatic and iterative process by which generative model 104 may be updated based on discriminative outcomes of discriminative system 112.

In some embodiments, generative model 104 and deterministic generative rules 106 may be configured to work in conjunction with one another to generate the synthetic network traffic data created by generative system 102. Generative model 104 may be configured to ensure that the data has sufficient probabilistic variation for random values in the data to be supplied as needed and for the generated data to function in a reciprocal learning environment of a GAN, while deterministic generative rules 106 may be configured to ensure that the generated synthetic network traffic data does not assume one or more characteristics that would make the synthetic data non-viable or otherwise overtly obvious as synthetic data. For example, deterministic generative rules 106 may be configured to ensure that the generated synthetic data complies with one or more network traffic protocols or complies with one or more RFC documents. Deterministic generative rules 106 may, in some embodiments, ensure that the generated synthetic network traffic data would be viable in a genuine network environment, such that the data could actually be transmitted and processed by a router and/or by one or more other network devices.

In some embodiments, generative rules 106 may be configured to enforce one or more syntactical rules on the synthetic network traffic data being generated by system 102. In some embodiments, the one or more syntactical rules may include one or more production rules for strings in the generated data. In some embodiments, the one or more syntactical rules may comprise one or more formal grammars. In some embodiments, the one or more formal grammars may include a context-free grammar. Deterministic rules to enforce syntax may include, for example: Regular Expressions, Context Free Grammar Parsers, and/or Context Free Grammar Parsers that accommodate left recursion (see, e.g., Frost, R. and Hafiz, R., A New Top-Down Parsing Algorithm to Accommodate Ambiguity and Left Recursion in Polynomial Time, ACM SIGPLAN Notices, Volume 41 Issue 5, Pages: 46-54 (2006).

In some embodiments, generative system 102 may be configured such that deterministic generative rules 106 generate a first portion of the generated synthetic network traffic data while generative model 104 generates a second portion of the generated synthetic network traffic data. For example, in some embodiments, deterministic generative rules 106 may generate portions of the synthetic network traffic data that are required to comply with one or more strict structural or syntactical rules in order to function as network traffic and/or comply with one or more protocols or RFCs, while generative model 104 may generate portions of the synthetic network traffic data whose values may vary quasi-randomly without violating structural/syntactical rules for the data. For example, deterministic generative rules 106 may define a structure for the synthetic data and generative model 104 may supply quasi-random (e.g., probabilistically generated) values for the synthetic data, such as time values for time-stamp data.

In some embodiments, deterministic generative rules 106 may define one or more ranges within which generative model 104 may operate probabilistically. For example, deterministic generative rules 106 may define an upper and/or lower bound for a data value, and generative model 104 may generate a data value, in compliance with the enforced bounds, using one or more probabilistic algorithms.

In some embodiments, deterministic generative rules 106 may define one or more order-based criteria with which values probabilistically defined by generative model 104 must comply. For example, an order-based criteria may require that a first value precede (e.g., be smaller than) a second value. In some embodiments, an order-based criteria may require that a set of two or more values comply with a predetermined order when sorted in accordance with a predefined value or characteristic. In some embodiments, order-based criteria may comprise temporal-relationship criteria, such as requiring that time-data (e.g., a time stamp) for a first value precede time-data (e.g., a time stamp) for a second value. In some embodiments, by enforcing order-based criteria and/or temporal-relationship criteria, deterministic generative rules 106 may prevent generative model 104 from causing the generated synthetic data to be non-sensical, non-functional, or otherwise obviously synthetic. For example, enforcing order-based criteria and/or temporal-relationship criteria may ensure that time-stamps in NTP data (e.g., time-stamps for Reference, Originate, Receive, and Transmit) appear in the correct order and are not caused to appear in a nonsensical order by unchecked probabilistic variation of generative model 104. In another example, enforcing order-based criteria may ensure that a time-stamp data associated with a message falls before a time-stamp for data associated with a response to the message. As discussed herein, a range defined by deterministic generative rules 106 may be defined with respect to an absolute value or with respect to one or more other values (e.g., to ensure that two data values are or are not within a threshold range of one another).

In some embodiments, deterministic generative rules 106 may define one or more data set completeness criteria. For example, deterministic generative rules 106 may require that, if one a first data value or data object is generated as part of the synthetic network traffic data, then one or more other data values or data objects must also be generated to create a complete data set to which the first data value belongs. Data set completeness criteria may prevent the probabilistic variation introduced by generative model 104 from causing the generated synthetic network traffic data from including incomplete data sets or isolated data objects that would not or could not occur in genuine network traffic data, thereby ensuring that the generated synthetic data is more difficult to distinguish from genuine network traffic data on that basis. In some embodiments, while deterministic generative rules 106 may enforce data set completeness criteria to ensure that data sets are complete, generative model 104 may nonetheless be used to generate values for one or more of the data values and/or data objects in the complete data set.

In some embodiments, deterministic generative rules 106 may define one or more cross-correlation criteria with which the generated synthetic network traffic data may be required to comply. For example, IP packet headers may contain optional fields (byte 20+), which means that the Internet Header Length may need to be changed from the typical default of four in order to account for the optional fields (e.g., four+the number of options). If these lengths are not consistent, then the packet generated packet may be determined to be invalid. Thus, generative rules 106 may be configured to ensure, using one or more cross-correlation criteria, that these lengths are consistent. As another example, TCP header flags have restrictions as well, for example a restriction against sending a FIN flag and a RST flag at the same time. Thus, generative rules 106 may be configured to ensure, using one or more cross-correlation criteria, that TCP header restrictions are not violated.

As shown in FIG. 1, generative system 102 may be communicatively coupled (e.g., by wired or wireless network communication) with generated synthetic network traffic data store 108, which may comprise any one or more computer-readable storage mediums configured to store the generated synthetic network traffic data created by generative system 102. Generated synthetic network traffic data store 108 may be communicatively coupled with both generative system 102 and discriminative system 112, such that synthetic network traffic data may be stored on store 108 by system 102 and may be read from store 108 by system 112. In some embodiments, generated synthetic network traffic data store 108 may be provided as one or more computer memory devices, one or more databases, one or more distributed data stores, or the like.

In some embodiments, generated synthetic network traffic data store 108 may store a single dataset of synthetic network traffic data; in some embodiments, generated synthetic network traffic data store 108 may store multiple datasets of synthetic network traffic data, such as different data sets generated by generative system 102 using different settings (e.g., different deterministic generative rules and/or different generative models) and thereby having different data characteristics. In some embodiments, different data sets of network traffic data may be indexed or otherwise associated with metadata in generated synthetic network traffic data store 108, such that data from one or more different data sets may be selected for different applications. In some embodiments, individual data objects (e.g., a synthetic network traffic packet) stored in store 108 may be indexed or otherwise associated with metadata indicating that the data object is included in one or more data sets.

As shown in FIG. 1, system 100 may further include genuine network traffic data store 110, which may comprise any one or more computer-readable storage mediums configured to store genuine network traffic data. The genuine network traffic data stored on data store 110 may include packet data (e.g., PCAP data), entire network packets, message hash data, message identifier data, data regarding network traffic modes, network time protocol (NTP) data, and/or flow data. In some embodiments, data store 110 may share any one or more characteristics in common with data store 108; data store 110 may differ from data store 108 in that, while data store 108 may be configured to receive and store synthetic network traffic data from generative system 102, data store 110 may instead be configured to receive and store genuine network traffic data. The genuine network traffic data received by and/or stored on data store 110 may include network traffic data captured from one or more genuine network traffic environments (e.g., from different networks, form different locations within the same network) and/or using one or more different network traffic capture systems.

Similarly to data store 108, data store 110 may include multiple data sets of network traffic data, which may be indexed or otherwise tagged for use in different applications. In some embodiments, entire data sets of different kinds of network traffic data may be stored separately; in some embodiments, individual data objects (e.g., individual packets) may be indexed or otherwise associated with metadata indicating that the data object is included in one or more data sets.

Both generated synthetic network traffic data store 110 and genuine network traffic data store 112 may be communicatively coupled (e.g., by wired or wireless network communication) with discriminative system 112, which may comprise any one or more computer systems configured to generate an assessment as to whether network traffic data is synthetic or genuine. In some embodiments, discriminative system 112 may comprise any one or more processors, personal computers, super-computers, servers, and/or virtual machines configured to execute instructions stored locally or remotely to (1) receive, store, and/or analyze network traffic data and/or to (2) generate, store, and/or transmit discriminative output data 118 representing an assessment as to whether analyzed data is determined to be genuine or synthetic.

As shown in FIG. 1, discriminative system 112 may comprise discriminative classifier 114 and deterministic discriminative rules 116, each of which may be a set of instructions stored on one or more storage mediums and configured to be executed by one or more processors of discriminative system 112 as part of the process by which discriminative system 112 generates discriminative output data 118 indicating whether analyzed network traffic data is determined to be genuine or synthetic. In some embodiments, discriminative classifier 114 and deterministic discriminative rules 116 may be stored on the same storage medium and/or configured to be executed by the same one or more processors. In some embodiments, discriminative classifier 114 and deterministic discriminative rules 116 may be stored on different storage mediums and/or configured to be executed by different sets of one or more processors.

In some embodiments, discriminative classifier 114 may be a model trained using one or more machine learning processes and configured to contribute to at least part of a determination as to whether analyzed network traffic data constitutes genuine network traffic data or synthetic network traffic data. Discriminative classifier 114 may be configured to make assessments based on the data being analyzed, wherein the assessments may be based on patterns that are learned based on review of other data (e.g., review of known-genuine network-traffic data received from data store 110). In some embodiments, discriminative classifier 114 may comprise any one or more deep learning architectures that may be configured to receive features of a packet (and/or other features of network traffic) and translate those features into a single variable. In some embodiments, as discussed further below, discriminative classifier 114 may be configured to be updated by discriminative system 112 based on results of attempts by discriminative system 112 to classify synthetic network traffic data generated by generative system 102. In this way, discriminative classifier 114 may be configured to be refined and improved (e.g., trained) by discriminative system 112 over many iterations, such that, over time, the algorithms applied by discriminative classifier 114 may result in network traffic data classification that is more and more difficult for generative system 102 to deceive.

In some embodiments, discriminative classifier 114 may be initialized using random settings for one or more weights that may be generated using a predefined distribution (e.g., a normal distribution). Seed and variance for use by discriminative classifier 114 may be set as hyperparameters. Discriminative classifier 114 may be updated using Adaptive Momentum Estimation (Adam) and/or one or more other appropriate gradient descent systems. The number of levels and neurons in each level for discriminative classifier 114 may be determined through testing, and may be considered hyperparameters. Initial settings for numbers of levels and neurons may be initially selected through experience with related systems and may be varied by gradient descent based on the accuracy achieved.

In some embodiments, deterministic discriminative rules 116 may comprise a set of one or more hard-coded, manually-specified, non-probabilistic, and/or inviolable requirements configured to be applied to at least part of the classification process for generating discriminative output data 118 indicating whether analyzed network traffic data is determined to be genuine or synthetic. In some embodiments, deterministic discriminative rules 116 may be defined by a user configuring system 100; e.g., a user may hard code or otherwise specify one or more inviolable classification standards for determining that analyzed network traffic is genuine and/or for determining that analyzed network traffic is synthetic. In some embodiments, discriminative system 112 may be configured such that deterministic discriminative rules 116 may not be updated automatically by discriminative system 112 based on results of attempts by discriminative system 112 to classify synthetic network traffic data generated by generative system 102; in some embodiments, discriminative system 112 may be configured such that deterministic discriminative rules 116 may only be updated or modified by manual user input, or by another (potentially automated) process that is separate and apart from the automatic and iterative process by which discriminative classifier 114 may be updated based on discriminative outcomes of discriminative system 112.

In some embodiments, discriminative classifier 114 and deterministic discriminative rules 116 may be configured to work in conjunction with one another to generate the discriminative output data 118 created by discriminative system 112. In some embodiments, discriminative output data 118 may represent a determination as to whether analyzed network traffic data is determined to be synthetic or genuine; in some embodiments, discriminative output data 118 may include a binary determination (e.g., "genuine" or "synthetic") and/or may include a quantified ranking or score indicating a determined likelihood that the analyzed data is either synthetic or genuine (e.g., "92% certain to be synthetic"). In some embodiments, discriminative classifier 114 and deterministic discriminative rules 116 may each contribute to generation of the output data 118. In some embodiments, discriminative output data 118 may comprise a combination of classifier output data generated by discriminative classifier 114 and deterministic output data generated by deterministic discriminative rules 116. In some embodiments, the output data generated respectively by 114 and/or 116 may be generated as a probability and/or as a multiplier configured to modify another probability by increasing it or decreasing it. In some embodiments, the two kinds of output data generated respectively by 114 and 116 may be combined with one another, for example by being multiplied with one another (with or without use of one or more weights) to generate, as a product, a determined overall probability of the analyzed data being genuine. Alternatively or additionally, the two kinds of output data generated respectively by 114 and 116 may be combined with one another using any suitable Markov logic.

In some embodiments, discriminative classifier 114 may be configured to base all or part of its assessment of data on a comparison of the data to be assessed against (1) one or more corpuses of known-genuine network traffic data (e.g., data from data store 110), (2) one or more known corpuses of known-synthetic network traffic data, and/or (3) results and/or outcomes of previous iterations of assessment of synthetic network traffic data generated by generative system 102. While discriminative classifier 114 may be configured to classify data in accordance with a flexible, evolving, iterative reciprocal learning environment of a GAN, deterministic discriminative rules 116 may be configured to ensure that the assessment of network traffic data does not deviate from one or more inviolable conditions for determining that data is synthetic or genuine, regardless of what patterns may or may not appear in data analyzed by the system. In this way, system administrators may "hard-code" one or more rules into discriminative system 112 to prevent system 112 from classifying data as genuine if the data has any one or more predetermined characteristics that system administrators do not wish to allow to appear in the generated synthetic data. In this way, deterministic discriminative rules 116 may be used as a tool to force system 100 to reject any data that violates predetermined conditions stipulated by system administrators, thereby ensuring that system 100 will not learn to create synthetic network traffic data that violates those predetermined conditions. It should be noted that deterministic discriminative rules may be used to guide the manner in which system 100 learns with or without imposing deterministic generative rules (e.g., rules 106) on generative system 102.

In some embodiments, deterministic discriminative rules 116 may be configured to enforce any one or more of the same or similar conditions as discussed above with respect to deterministic generative rules; that is, for any instance in which a deterministic generative rule may be used to require that generated synthetic network traffic data must satisfy one or more conditions, a deterministic discriminative rule may be used to require that any network traffic data not satisfying those same one or more conditions must be identified as synthetic network traffic data (and not identified as genuine network traffic data).

Thus, for example, deterministic discriminative rules 116 may be used to require that data identified as genuine network traffic data must comply with one or more network traffic protocols or comply with one or more RFC documents. Deterministic discriminative rules 116 may, in some embodiments, require that data identified as genuine network traffic data would be viable in a genuine network environment, such that the data could actually be transmitted and processed by a router and/or by one or more other network devices.

In some embodiments, deterministic discriminative rules 116 may require that data identified as genuine network traffic data must comply with one or more syntactical rules. In some embodiments, the one or more syntactical rules may include one or more production rules for strings in the network traffic data. In some embodiments, the one or more syntactical rules may comprise one or more formal grammars. In some embodiments, the one or more formal grammars may include a context-free grammar.

In some embodiments, discriminative system 112 may be configured such that deterministic discriminative rules 116 make a first determination regarding whether network traffic data is genuine and discriminative classifier 114 makes a second determination regarding whether the network traffic data is genuine, wherein both the first determination and the second determination contribute to discriminative output data 118. For example, in some embodiments, deterministic discriminative rules 116 may determine whether one or more portions of the synthetic network traffic data comply with one or more strict structural or syntactical rules in order to function as network traffic and/or comply with one or more protocols or RFCs, while discriminative classifier 114 may analyze portions of the synthetic network traffic data whose values may be expected to vary quasi-randomly without violating structural/syntactical rules for genuine network traffic data. For example, deterministic discriminative rules 116 may ensure that the analyzed network traffic data complies with one or more predefined structures for the data, while discriminative classifier 114 may analyze one or more values within the data itself, such as time values for time-stamp data.

In some embodiments, deterministic discriminative rules 116 may determine whether network traffic data values fall within one or more ranges, and then discriminative classifier 114 may analyze the values and/or distributions of data within those ranges, including by comparing those data values to data values from known-genuine network traffic data. For example, deterministic discriminative rules 116 may check with compliance with an upper and/or lower bound for a data value, and discriminative classifier 114 then further analyze one or more data values that are confirmed to fall within the predefined range. As discussed herein, a range defined by deterministic discriminative rules 116 may be defined with respect to an absolute value or with respect to one or more other values (e.g., to ensure that two data values are or are not within a threshold range of one another).

In some embodiments, deterministic discriminative rules 116 may define one or more order-based criteria with which network traffic data values must comply in order for the network traffic data to be deemed genuine. For example, an order-based criteria may require that a first value precede (e.g., be smaller than) a second value. In some embodiments, an order-based criteria may require that a set of two or more values comply with a predetermined order when sorted in accordance with a predefined value or characteristic. In some embodiments, order-based criteria may comprise temporal-relationship criteria, such as requiring that time-data (e.g., a time stamp) for a first value precede time-data (e.g., a time stamp) for a second value. In some embodiments, by enforcing order-based criteria and/or temporal-relationship criteria, deterministic discriminative rules 106 may identify any synthetic data as synthetic on the basis that data values therein are nonsensical or non-functional. For example, order-based criteria and/or temporal-relationship criteria may identify data as synthetic if time-stamps in NTP data (e.g., time-stamps for Reference, Originate, Receive, and Transmit) appear in an incorrect order, which may indicate probabilistically-generated synthetic data as opposed to genuine network traffic data. In another example, enforcing order-based criteria may identify data as synthetic if that a time-stamp data associated with a message does not fall before a time-stamp for data associated with a response to the message.

In some embodiments, deterministic discriminative rules 116 may enforce one or more data set completeness criteria. For example, deterministic discriminative rules 116 may require that, if one a first data value or data object is present as part of the analyzed network traffic data, then one or more other data values or data objects must also be present within the analyzed data to create a complete data set to which the first data value belongs. Data set completeness criteria may identify network traffic data as synthetic in the event that the analyzed network traffic data from includes incomplete data sets or isolated data objects; in some embodiments, these incomplete data sets or isolated data objects would not or could not occur (or would be unlikely to occur) in genuine and functional network traffic data, and their presence may therefore indicate that the data is probabilistically generated synthetic data. In some embodiments, deterministic discriminative rules 116 may enforce data set completeness criteria on analyzed network traffic data, while discriminative classifier 114 may analyze data values and/or data objects within the data sets that deterministic discriminative rules 116 determine to be complete.

In some embodiments, deterministic discriminative rules 116 may require that analyzed network traffic data comply with one or more cross-correlation criteria. For example, cross-correlation criteria analyzed by deterministic discriminative rules 116 (and/or enforced by deterministic generative rules 106, as discussed above) may include the exemplary cross-correlation criteria discussed above regarding header length and/or TCP header flag restrictions. As another example, cross-correlation criteria analyzed by deterministic discriminative rules 116 (and/or enforced by deterministic generative rules 106, as discussed above) may include enforcement of the SYN-ACK-data-FIN (or RST) protocol for TCP communication. As yet another example, cross-correlation criteria analyzed by deterministic discriminative rules 116 (and/or enforced by deterministic generative rules 106, as discussed above) may include enforcement of criteria regarding checksums at the end of a packet, which may be determined deterministically and would not be something that could be generated by a generative network system as discussed herein (but could be done by an follow-on processing operation).

Although system 100 in FIG. 1 shows an architecture in which generative system 102 and discriminative system 112 are provided separately, it is also contemplated that generative system 102 and discriminative system 112 may be provided as part of a single computing component, such as different processes executable by a single processor. Similarly, although system 100 in FIG. 1 shows an architecture in which data store 108 and data store 110 are provided separately, it is also contemplated that data store 108 and data store 110 may be provided as different portions of a single database or different datasets stored on a single storage medium. In general, it is contemplated that any one or more of the components of system 100 in FIG. 1 may be provided as separate components or as a single/combined component or module.

Exemplary Method

FIG. 2 depicts a method for refining models for generating and classifying synthetic network traffic data, in accordance with some embodiments. In some embodiments, method 200 may be performed by a system for refining models for generating and classifying synthetic network traffic data, such as system 100 as described above.

At block 202, in some embodiments, the system may receive input configuring a deterministic generative rule set and a deterministic discriminative rule set. In some embodiments, the inputs may be received at a generative system such as system 102 and at a discriminative system such as system 112, respectively. The inputs configuring the deterministic rule sets may be received from a local or remote administrator system that is communicatively coupled (e.g., by wired or wireless network communication) to one or both systems. The deterministic rule sets themselves may have any one or more characteristics in common with the deterministic rule sets discussed above with reference to FIG. 1.

In some embodiments, the input configuring the deterministic rule sets may comprise settings for the generative rule sets selected by a user; the settings may be selected, in some embodiments, based on the nature and/or characteristics of synthetic network traffic that the user would like for the system to generate. By allowing users to manually stipulate different deterministic rules for the deterministic rule sets, the system may be configurable for use in different settings and different applications, including to generate synthetic network traffic approximating different kinds of network traffic, network traffic captured in different network environments, network traffic captured using different network capture devices, etc.

While block 202 contemplates the system receiving input for configuring both a generative deterministic rule set and a discriminative deterministic rule set, it should be noted that some systems may apply a generative deterministic rule set without applying a discriminative deterministic rule set, while some systems may apply a discriminative determin- istic rule set without applying a generative deterministic rule set.

At block 204, in some embodiments, the system may generate synthetic network traffic data. In some embodi- ments, the synthetic network traffic data may be generated by a generative system such as generative system 102 as described above. The generated synthetic network traffic data may include synthetic packet data (e.g., PCAP data), entire synthetic network packets, synthetic message hash data, synthetic message identifier data, synthetic data regard- ing network traffic modes, synthetic network time protocol (NTP) data, and/or synthetic flow data. The generated syn- thetic network traffic data may have any one or more characteristics of the synthetic network traffic data described above with reference to FIG. 1.

At block 206, in some embodiments, generating the synthetic network traffic data may comprise applying the deterministic generative rule set to generate at least part of the synthetic network traffic data. At block 208, in some embodiments, generating the synthetic network traffic data may comprise applying a probabilistic generative model set to generate at least part of the synthetic network traffic data. As described above with reference to FIG. 1, deterministic generative rules and a probabilistic generative model may in some embodiments work in conjunction with one another to generate synthetic network traffic data; e.g., both a deter- ministic generative rule set and a probabilistic generative model may contribute to the creation of different data objects within a single data set, to the creation of different data values within a single data set, to the creation of a single data object, and/or to the creation of a single data value. As described above with reference to FIG. 1, deterministic generative rules and a probabilistic generative model may in some embodiments work in conjunction to generate syn- thetic network traffic data by applying the deterministic generative rules to ensure that the data does not violate one or more predetermined inviolable conditions for the data while applying the probabilistic generative model to allow the data values and/or data structure to otherwise be proba- bilistically varied.

In some embodiments, the generated synthetic network traffic data may be stored locally and/or transmitted to one or more system components for remote storage and/or analysis. In some embodiments, the generated synthetic network traffic data may be transmitted to a data store such as data store 108 as described above with reference to system 100 in FIG. 1.

At block 210, in some embodiments, the system may generate an assessment of whether the synthetic network traffic appears to be synthetic or genuine.

In some embodiments, the assessment may be generated by a discriminative system such as discriminative system 102 as described above. The assessment may represent a determination by the discriminative system as to whether the generated synthetic network traffic data appears to be syn- thetic data or appears to be genuine (e.g., captured) network traffic data. In some embodiments, the assessment may include a binary indication of whether the generated syn- thetic data appears to be genuine or synthetic and/or may include a quantified ranking or score indicating a determined likelihood that the analyzed data is either synthetic or genuine (e.g., "92% certain to be synthetic"). In some embodiments, the assessment of whether the synthetic net- work traffic appears to be synthetic or genuine may share any one or more characteristics in common with discrimi- native output data 118 described above with reference to FIG. 1.

At block 212, in some embodiments, generating the assessment may comprise applying the deterministic dis- criminative rule set to the synthetic network traffic data. At block 214, in some embodiments, generating the assessment may comprise applying a discriminative classifier to com- pare the synthetic network traffic data to genuine network traffic data.

As described above with reference to FIG. 1, determin- istic discriminative rules and a discriminative classifier may in some embodiments work in conjunction with one another to generate an assessment of whether network traffic data appears to be synthetic or appears to be genuine; e.g., both a deterministic discriminative rule set and a discriminative classifier may contribute to the creation of an assessment of analyzed network traffic data, whether by weighing in favor of the analyzed network traffic data being deemed synthetic or in favor of the analyzed network traffic data being deemed genuine. As described above with reference to FIG. 1, deterministic discriminative rules and a discriminative clas- sifier may in some embodiments work in conjunction to generate an assessment of whether network traffic data is judged to appear to be genuine or synthetic. For example, the deterministic discriminative rules may be applied to deter- mine whether the analyzed data complies with one or more predetermined inviolable conditions for deeming data genu- ine, while the discriminative classifier may be applied to compare the analyzed data against one or more patterns learned by the classifier based on observation of an com- parison to one or more corpuses of known-genuine network traffic data (e.g., data stored in genuine network traffic data store 110 in system 100).

In some embodiments, the generated assessment as to whether the network traffic data appears to be genuine or synthetic may be stored locally and/or transmitted to one or more system components for remote storage and/or analysis. In some embodiments, the generated assessment may be transmitted to the generative system (e.g., generative system 102), the discriminative system (e.g., discriminative system 112), and/or an associated administrator system so that the generated assessment may thereafter be used to update and refine one or both of the probabilistic generative model of the generative system and the discriminative classifier of the discriminative system.

At block 216, in some embodiments, based on the assess- ment of the synthetic network traffic data, the system may update one or both of the probabilistic generative model and the discriminative classifier. As mentioned above, data regarding the assessment (e.g., discriminative output data 118) may be transmitted from a discriminative system that generates the assessment to one or more other systems such as a generative system and/or ad administrator system, and the assessment data may be used to make one or more modifications or refinements to a probabilistic generative model and/or to a discriminative classifier. By updating one or both of the probabilistic generative model and the dis- criminative classifier based on assessment outcomes, the system (e.g., system 100) may function as a modified generative adversarial network in order to refine and improve the probabilistic generative model and the discrimi- native classifier over multiple iterations of the process described herein.

In some embodiments, updates made to the generative model and/or to the discriminative classifier may be based on whether (and/or to what extent) the assessment of the synthetic network traffic data was accurate. For example, if the assessment accurately assessed the generated synthetic network traffic data as synthetic, then the discriminative classifier may not be updated (or may be updated such that parameters of the classifier are modified only slightly), such that the discriminative classifier may continue to accurately assess network traffic data in future iterations. Meanwhile, if the assessment accurately assessed the generated synthetic network traffic data as synthetic, then the generative model may be updated (including by being updated such that parameters of the model are modified significantly), such that the generative model may generate synthetic data that is less likely to be identified as synthetic and more likely to pass as genuine network traffic data in future iterations.

On the other hand, if the assessment inaccurately assessed the generated synthetic network traffic data by classifying it as genuine, then the discriminative classifier may be updated (including by being updated such that parameters of the classifier are modified significantly), such that the discriminative classifier may more accurately classify synthetic network traffic data in future iterations. Meanwhile, if the assessment inaccurately assessed the generated synthetic network traffic data by classifying it as genuine, then the generative model may not be updated (or may be updated such that parameters of the model are modified only slightly), such that the generative model may continue to generate synthetic data that is likely to pass as genuine network traffic data in future iterations.

In some embodiments, the feedback function of block 216 by which the system may update one or both of the probabilistic generative model and the discriminative classifier may comprise applying one or more loss functions, such as minimax loss and/or Wasserstein loss. In some embodiments, the feedback function of block 216 may provide improved effectiveness and efficiency due to the application of deterministic discriminative rules. In accordance with the application of a deterministic discriminative rule, the system may be able to safely reject or accept the assessed data as artificially generated or as genuine with a higher degree of confidence than if the rejection were based solely on a probabilistic discriminator function. For example, in some embodiments, the outcome of a deterministic discriminative rule may involve multiplying an initial assessed probability of data being genuine (generated by, e.g., discriminative classifier 114) by a multiplier determined by the deterministic discriminative rule. Applying the deterministic multiplier may make the overall assessed probability larger or smaller than the probability assessed solely by the probabilistic discriminative classifier, including by forcing the overall probability to 1, to greater than 99.9999%, to greater than 99.999%, to greater than 99.99%, to greater than 99.9%, to greater than 99%, to less than 1%, to less than 0.1%, to less than 0.01%, to less than 0.001%, to less than 0.0001%, or to 0. These adjustments implemented by the use of deterministic discriminative rules may improve overall system performance by preventing inaccurate assessments, errors, and inefficiencies that could be introduced by a fully independent GAN system.

As a related consideration, when configuring the system such that data may be determined in accordance with one or more deterministic discriminative rules to have a very high probability, 100% probability, very low probability, or zero probability of being genuine data, it may be important to robustly vet said deterministic discriminative rules. In order to do so, they system may test deterministic generative rules against training/test data before implementing said rules in a generative adversarial network system as disclosed herein.

If a deterministic rule intended to be violated only by synthetic data is violated by genuine data during training/testing (or, e.g., if such a deterministic rule is violated by more than a predetermined threshold percentage of genuine data during training/testing), then the system and or user may modify the deterministic rule to account for the existence of a potential violation in genuine data.

In some attacks, malicious actors may intentionally construct badly formed packets to try to fool network security systems. Thus, in some embodiments, it may be desirable for a system to regard badly constructed data as "valid," since badly-constructed data may be representative of genuine malicious behavior. A system configured to regard some badly-constructed data as "valid" may capture, in the GAN, behavior that may be representative of real-world malicious activity. In some applications, it may be desirable to simulate a real-world environment in which malicious badly-constructed data is present; while in some embodiments it may be desirable to simulate a real-world environment in which malicious badly-constructed data is not present. Thus, in some embodiments of the generative adversarial network systems disclosed herein, the system may be configured to either (a) allow this kind of badly-constructed data (e.g., by configuring the rules of the GAN to treat said data as genuine, in some or all instances), thereby allowing for "hacker-like" behavior to be generated by the generative adversarial network system, or (b) disallow this kind of offending data by enforcing rules that prevent the data from being generated and/or classify the data as not genuine, thereby causing the generative adversarial network system to only generate "acceptable" data.

As shown in FIG. 2, following block 216 method 200 may revert to block 204 at which point new synthetic network traffic data may be generated and then a new assessment of the new synthetic network traffic data may be generated at block 210. The new synthetic data and new assessments may be generated following one or both of the generative model and the discriminative classifier being updated, such that the system may repeatedly update the model and classifier over many iterations. After many iterations, the generative model and discriminative classifier may be refined and may demonstrate improved performance, while the generative system and discriminative system within which they are respectively provided may still enforce the deterministic rule sets stipulated by the user. In this way, the generative system and discriminative system may be refined for improved performance within the constraints defined by the deterministic rule sets.

After one or more iterations of the iterative refinement process including the updates made at block 216, model 200 may progress from block 204 to block 218. That is, synthetic network traffic data generated at block 204 may be used at block 218 alternatively to (or in addition to) being used at block 210.

At block 218, in some embodiments, the system may train one or more network security systems using synthetic network traffic generated using the refined probabilistic generative model. For example, after using the iterative refinement process including the updates made at block 216 to improve the generative system to generate synthetic network traffic data that both (1) complies with the deterministic generative rule set and (2) is effective at deceiving discriminative systems such that the generated synthetic data is sufficiently similar to genuine network traffic data to be used in network security applications. Once the generative system has been refined using the techniques disclosed herein, the system may thus be used to generate synthetic network traffic data to build a corpus of synthetic training data, wherein the corpus of synthetic training data will have the required data characteristics in order for the corpus to be used to train cyber-analytics algorithms for use in network security applications in deep-packet inspection and/or flow-based analysis It should be noted that when potential network behaviors are sufficiently unlikely, such as when a certain IP address or protocol is very infrequently used, a considerable amount of training is necessary to capture its behavior. In the case of large numbers of categories that appear infrequently for an input, such as a set of IPs or Ports that are present in genuine network data at only a low frequency, a system may be able to estimate statistics for these unusual categories by counting the number of instances in which they do appear. For these kinds of infrequent network behaviors, accurately training a generative adversarial system to account for these behaviors may require a high number of training iterations and/or a larger body of training data. In some embodiments, a system may be configured to capture these infrequent behaviors in an "other" field, where "other" may represent the set of infrequent behaviors. An "other" field can, in some embodiments, be implemented as explicit randomized category selection through non-neural network processes (e.g., selecting from a table), or as a subnetwork trained only on the infrequent data.

In some embodiments, the system may be configured to cease the iterative refinement process and/or to progress to an application step such as block 218 in accordance with a determination that one or more conditions has been satisfied. In some embodiments, the one or more conditions may include one or more performance metrics for the generative system, such that the system may only cease the iterative process once the generative system has been verified as performing sufficiently well. For example, a performance metric may include a requirement that a minimum threshold of synthetic network traffic data generated by the generative system is classified by the discriminative system as genuine, and/or that synthetic network traffic data generated by the generative system is classified by the discriminative system as genuine for a minimum number of threshold iterations (or for a minimum threshold percentage of a contiguous block of iterations).

Exemplary Computing Components

Figure 3:
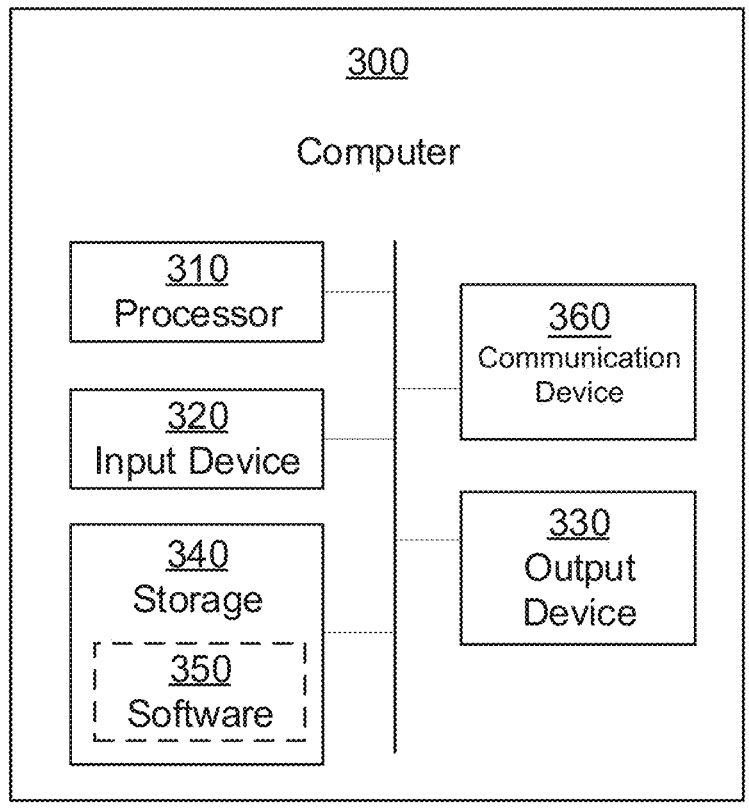
FIG. 3 depicts a computer, according to some embodiments.

FIG. 3 illustrates a computer, in accordance with some embodiments. Computer 300 can be a component of a system for refining models for generating and classifying synthetic network traffic data, such as system 100 and/or any of its subcomponents described above with reference to FIG. 1. In some embodiments, computer 300 may be configured to execute a method for refining models for generating and classifying synthetic network traffic data, such as all or part of method 200 of FIG. 2. In some embodiments, computer 300 may be configured to execute any of the other techniques discussed herein, alone and/or in combination with one another and/or with method 200.

Computer 300 can be a host computer connected to a network. Computer 300 can be a client computer or a server. As shown in FIG. 3, computer 300 can be any suitable type of microprocessor-based device, such as a personal computer; workstation; server; or handheld computing device, such as a phone or tablet. The computer can include, for example, one or more of processor 310, input device 320, output device 330, storage 340, and communication device 360.

Input device 320 can be any suitable device that provides input, such as a touch screen or monitor, keyboard, mouse, or voice-recognition device. Output device 330 can be any suitable device that provides output, such as a touch screen, monitor, printer, disk drive, or speaker.

Storage 340 can be any suitable device that provides storage, such as an electrical, magnetic, or optical memory, including a RAM, cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly. Storage 340 can be a non-transitory computer-readable storage medium comprising one or more programs, which, when executed by one or more processors, such as processor 310, cause the one or more processors to execute methods described herein, such as all or part of method 200 described with reference to FIG. 2.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can be implemented and executed on a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 300 may be composed of components which are interconnected across a network, such as a distributed system. Computer 300 may be organized into any suitable topology, such as a star topology, a recursively defined topology, a mesh topology, a ring topology, or an ad-hoc topology.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. For example, while the disclosure herein has been set forth with reference to examples regarding network traffic data, a person of skill in the art will appreciate, in light of the disclosure herein, that the systems and methods disclosed herein may be applied in similar manners to generate other kinds of data aside from (or in addition to) network traffic data, including other kinds of data that require adherence to one or more sets of strict syntactical rules such that traditional GAN methods have not been successfully applied to generate those kinds of data. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for training one or more cyber-analytics models based on refined synthetic network traffic data, the system comprising one or more processors configured to:

generate synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

execute a discriminative classifier model configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on the classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection.

2. The system of claim 1, wherein applying the deterministic generative rule set comprises enforcing a context-free grammar.

3. The system of claim 1, wherein generating the synthetic network traffic data comprises generating a plurality of synthetic network traffic packets.

4. The system of claim 1, wherein generating the synthetic network traffic data comprises generating synthetic IP address data.

5. The system of claim 1, wherein generating the synthetic network traffic data comprises generating synthetic message hash and identifier data.

6. The system of claim 1, wherein generating the synthetic network traffic data comprises generating synthetic data regarding a network traffic mode.

7. The system of claim 1, wherein generating the synthetic network traffic data comprises generating network time protocol (NTP) data.

8. The system of claim 1, wherein:

applying the deterministic generative rule set comprises, if a first data object is generated, requiring that set of one or more data objects related to the first data object also be generated; and applying the probabilistic generative model comprises generating a data value for one or both of the first data object and the set of one or more data objects.

9. The system of claim 1, wherein:

applying the deterministic generative rule set comprises setting a predetermined range for a data value; and applying the probabilistic generative model comprises generating the data value within the predetermined range.

10. The system of claim 1, wherein applying the deterministic generative rule set comprises enforcing temporal relationship criteria for a time-series of data objects.

11. The system of claim 1, wherein applying the deterministic generative rule set comprises enforcing a cross-correlation condition.

12. The system of claim 1, wherein applying the deterministic generative rule set comprises generating the synthetic network traffic data such that the synthetic network traffic data is configured to be processed by a router.

13. A method for training one or more cyber-analytics models based on refined synthetic network traffic data, the method performed at a system comprising one or more processors, the method comprising:

generating synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

executing a discriminative classifier model configured to receive the generated synthetic network traffic data and output a classification of the synthetic network traffic data as genuine or synthetic, wherein the discriminative classifier model comprises a deep learning architecture configured to recognize patterns in known-genuine network traffic data;

applying a minimax loss function or a Wasserstein loss function to iteratively refine the probabilistic generative model and the discriminative classifier model based at least in part on the classification output by the discriminative classifier model, wherein iteratively refining the discriminative classifier model comprises varying neural weights of the deep learning architecture using gradient descent optimization;

generating refined synthetic network traffic data using the refined probabilistic generative model, wherein the refined synthetic network traffic data is classified as genuine by the refined discriminative classifier model; and training, using the refined synthetic network traffic data, one or more cyber-analytics models configured to perform deep-packet inspection.

14. A non-transitory computer-readable storage medium for training one or more cyber-analytics models based on refined synthetic network traffic data, the non-transitory computer-readable storage medium storing instructions configured to be executed by one or more processors of a system to cause the system to:

generate synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

execute a discriminative classifier model configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on the classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection.

15. A system for training one or more cyber-analytics models based on refined synthetic network traffic data, the system comprising one or more processors configured to:

generate synthetic network traffic data, wherein generating the synthetic network traffic data comprises applying a probabilistic generative model to generate at least part of the synthetic network traffic data by creating probabilistic variations using one or more random number generators to supply quasi-random values;

generate an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection, wherein the generated synthetic network traffic data comprises (1) malformed network packets corresponding to known-genuine malicious behavior, and (2) network traffic data similar to known-genuine network traffic data.

16. The system of claim 15, wherein applying the deterministic generative rule set comprises enforcing a context-free grammar.

17. The system of claim 15, wherein:

applying the deterministic discriminative rule set to the synthetic network traffic data comprises generating deterministic discriminative rule set output data;

applying the discriminative classifier model to the synthetic network traffic data comprises generating discriminative classifier model output data; and generating the assessment of the generated synthetic network traffic data comprises combining the deterministic discriminative rule set output data and the discriminative classifier model output data.

18. The system of claim 15, wherein:

applying the deterministic discriminative rule set comprises, if a first data object is present in the generated synthetic network traffic data, requiring that a set of one or more data objects related to the first data object also be present in the generated synthetic network traffic data; and applying the discriminative classifier model comprises assessing a data value for one or both of the first data object and the set of one or more data objects.

19. The system of claim 15, wherein:

applying the deterministic discriminative rule set comprises requiring that a data value of the generated synthetic network traffic be within a predetermined range; and applying the probabilistic generative model comprises assessing the data value within the predetermined range.

20. A method for training one or more cyber-analytics models based on refined synthetic network traffic data, the method performed at a system comprising one or more processors, the method comprising:

generating synthetic network traffic data, wherein generating the synthetic network traffic data comprises applying a probabilistic generative model to generate at least part of the synthetic network traffic data by creating probabilistic variations using one or more random number generators to supply quasi-random values;

generating an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

applying a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generating refined synthetic network traffic data using the refined probabilistic generative model, wherein the refined synthetic network traffic data is classified as genuine by the refined discriminative classifier model; and training, using the refined synthetic network traffic data, one or more cyber-analytics models configured to perform deep-packet inspection, wherein the generated synthetic network traffic data comprises (1) malformed network packets corresponding to known-genuine malicious behavior, and (2) network traffic data similar to known-genuine network traffic data.

21. A non-transitory computer-readable storage medium for training one or more cyber-analytics models based on refined synthetic network traffic data, the non-transitory computer-readable storage medium storing instructions configured to be executed by one or more processors of a system to cause the system to:

generate synthetic network traffic data, wherein generating the synthetic network traffic data comprises applying a probabilistic generative model to generate at least part of the synthetic network traffic data by creating probabilistic variations using one or more random number generators to supply quasi-random values;

generate an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection, wherein the generated synthetic network traffic data comprises (1) malformed network packets corresponding to known-genuine malicious behavior, and (2) network traffic data similar to known-genuine network traffic data.

22. A system for training one or more cyber-analytics models based on refined synthetic network traffic data, the system comprising one or more processors configured to:

generate synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

generate an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection.

23. A method for training one or more cyber-analytics models based on refined synthetic network traffic data, the method performed at a system comprising one or more processors, the method comprising:

generating synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

generating an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

applying a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generating refined synthetic network traffic data using the refined probabilistic generative model, wherein the refined synthetic network traffic data is classified as genuine by the refined discriminative classifier model; and training, using the refined synthetic network traffic data, one or more cyber-analytics models configured to perform deep-packet inspection.

24. A non-transitory computer-readable storage medium for training one or more cyber-analytics models based on refined synthetic network traffic data, the non-transitory computer-readable storage medium storing instructions configured to be executed by one or more processors of a system to cause the system to:

generate synthetic network traffic data, wherein generating the synthetic network traffic data comprises:

applying a deterministic generative rule set to generate at least part of the synthetic network traffic data, wherein the at least part of the synthetic network traffic data generated by applying the deterministic generative rule set comprises malformed network packets corresponding to known-genuine malicious behavior; and applying a probabilistic generative model to generate at least part of the synthetic network traffic data by creating probabilistic variations using one or more random number generators to supply quasi-random values, wherein the at least part of the synthetic network traffic data generated by applying the probabilistic generative model comprises network traffic data similar to known-genuine network traffic data;

generate an assessment of the generated synthetic network traffic data, wherein generating the assessment comprises:

applying a deterministic discriminative rule set to the synthetic network traffic data; and applying a discriminative classifier model to the synthetic network traffic data, wherein the discriminative classifier model is configured to receive the generated synthetic network traffic data and output a classification of the synthetic network traffic data as genuine or synthetic, wherein the discriminative classifier model comprises a deep learning architecture configured to recognize patterns in known-genuine network traffic data;

apply a minimax loss function or a Wasserstein loss function to iteratively refine the probabilistic generative model and the discriminative classifier model based at least in part on classification output by the discriminative classifier model, wherein iteratively refining the discriminative classifier model comprises varying neural weights of the deep learning architecture using gradient descent optimization;

generate refined synthetic network traffic data using the refined probabilistic generative model, wherein the refined synthetic network traffic data is classified as genuine by the refined discriminative classifier model; and train, using the refined synthetic network traffic data, one or more cyber-analytics models configured to perform deep-packet inspection.

* * * * *